Patented Sept. 29, 1936

2,055,929

UNITED STATES PATENT OFFICE 2,055,929

PRODUCTION OF HYDROCARBON DERIVATIVES

Kenneth Shelley Jackson, Runcorn, and George Edwin Wainwright and Herbert Reginald Hailes, Norton-on-Tees, England, assignors to Imperial Chemical Industries Limited, a corporation of Great Britain No Drawing. Application April 5, 1935, Serial No. 14,956. In Great Britain April 6, 1934

5 Claims. (Cl. 260—161)

This invention relates to a process for the production of hydrocarbon derivatives from benzene, and particularly to the production of diphenyl and chlorinated diphenyl.

It has been previously proposed to pass benzene or partially chlorinated benzene together with chlorine through a reaction zone at a temperature of 375–700° C. and it was stated that pyrolysis occurred with the formation of some chlorinated diphenyl.

According to the present invention diphenyl and/or chlorinated diphenyls are produced by passing the vapours of benzene and/or monochlorobenzene and substantial amounts of polychlorobenzenes, together with chlorine, through a reaction zone at a temperature of about 700–850° C.

A suitable apparatus for carrying out the reaction comprises an electrically heated and unpacked silica tube through which the mixture of the reacting vapours and gases may be passed at a suitable velocity. Reaction times varying from 2 seconds to 1 minute may be used, but usually times of from 10–30 seconds are preferable.

The relative proportions of the constituents of the reaction mixture may be varied within wide limits. For instance, considerable yields of diphenyl and its derivatives have been obtained when the weight ratio:—benzene+monochlorobenzene:polychlorobenzenes has been 1:4, and also when the ratio has been 3:1. Similarly the ratio of the chlorobenzenes to chloride is capable of variation between relatively wide limits and results have been obtained using from two to eight volumes of chlorobenzenes to one volume of chlorine.

In carrying out the process it would appear that both pyrolysis and chlorination reactions occur, and the resulting products depend to a large extent on the composition of the mixture passed into the reaction zone. For instance, when the initial raw material includes a considerable proportion of benzene, the product contains diphenyl and more of the lower chlorinated diphenyls than when chlorobenzenes form substantially all the initial material. In addition to the diphenyl and diphenyl derivatives, we also find present in the reaction product chlorobenzenes produced by chlorination and also chlorobenzenes which have apparently been unchanged by the passage through the reaction zone. There is also present a certain amount of tarry and carbonaceous matter resulting from decomposition of the reactants. To recover the various constituents the reaction product is subjected to fractional distillation and the separate fractions further treated and purified to give the desired products. The diphenyl and chlorinated diphenyls may, for instance, be used as such, or they may be submitted to a chlorination process in the liquid phase to give a material of specified characteristics.

The chlorobenzenes in the reaction products may be separated and used as such for any desired purpose. Preferably, however, they are returned to the process as constituents of the mixture passed to the reaction zone. As a result of investigating this form of the process, we have found that it is possible to arrange the proportions of the constituents of the original reaction mixture so that the polychlorobenzenes pass through the process apparently unchanged.

In the preferred form of the process, therefore, a mixture of the vapours of benzene and/or monochlorobenzene with polychlorobenzenes from a previous run is passed together with chlorine through the reaction zone, the reaction product is fractionally distilled and the lower boiling fractions consisting of polychlorobenzenes returned directly to the process. The higher boiling portion is preferably immediately chlorinated to furnish a chlorinated diphenyl product which after suitable distillation and purification processes may be a liquid, or with a higher degree of chlorination a resin-like solid.

The following examples are illustrative of preferred forms of the invention, though the invention is not limited thereto:

Example 1

194 grams of benzene are mixed with 746 grams of a condensate containing 361 grams benzene, 268 grams monochlorobenzene, 113 grams dichlorobenzene and 14 grams trichlorobenzenes recovered from a previous operation. During a period of 5 hours this mixture is vaporized and the vapours passed together with 104 grams of chlorine gas through an unpacked silica tube 155 cms. long and 2.6 cms. diameter, which is electrically heated to a temperature of 700° C. The products leaving the pyrolysis zone are passed through a condenser to separate the normally liquid portion and the uncondensed portion consisting of hydrogen chloride is then absorbed in water. On fractionally distilling the condensate there are obtained 164 grams of a mixture (containing 11.5% fixed chlorine) of diphenyl and chlorinated diphenyls and 768 grams of a mixture of benzene, monochlorobenzene, dichlorobenzene and trichlorobenzene. This latter mixture is subsequently used with the addition of more benzene in another run.

Example 2

In the same apparatus a vaporized mixture containing 22.4% monochlorobenzene and 77.6% polychlorobenzenes recovered from a previous run, is passed at a rate of 175 grams per hour through the pyrolysis zone at 800° C., chlorine being simultaneously introduced at the rate of 9.5 litres per hour. The liquid products are condensed and the hydrogen chloride absorbed as in the first example. The liquid condensate obtained has the composition: 2.8% monochlorobenzene, 87.1% polychlorobenzenes, 8.9% chlorinated diphenyls (46% fixed chlorine) and 1.2% tarry matter.

We claim:—

1. Process for the production of diphenyls and chlorinated derivatives thereof which comprises passing the vapours of benzene in admixture with chlorine and substantial amounts of polychlorobenzenes through a reaction zone at a temperature of approximately 700–850° C.

2. Process for the production of diphenyls and chlorinated derivatives thereof which comprises passing the vapours of monochlorobenzene in admixture with chlorine and substantial amounts of polychlorobenzenes through a reaction zone at a temperature of approximately 700–850° C.

3. Process for the production of diphenyls and chlorinated derivatives thereof which comprises passing the mixed vapours of benzene and monochlorobenzene further admixed with chlorine and substantial amounts of polychlorobenzenes through a reaction zone at a temperature of approximately 700–850° C.

4. Process as claimed in claim 3 in which the relative proportions of the reacting constituents are so chosen that the amounts of polychlorobenzene in the initial and final products are substantially the same.

5. Process for the production of diphenyls and chlorinated derivatives thereof which comprises passing the mixed vapors of benzene and monochlorbenzene further admixed with chlorine and substantial amounts of polychlorobenzenes through a reaction zone at a temperature of approximately 700 to 850° C., the proportions of reacting constituents being so selected that the amounts of polychlorobenzene in the initial and final products are substantially the same, separating from the reaction product polychlorobenzenes and returning said polychlorobenzenes to the initial mixture of a succeeding operation.

KENNETH SHELLEY JACKSON.
GEORGE EDWIN WAINWRIGHT.
HERBERT REGINALD HAILES.

CERTIFICATE OF CORRECTION.

Patent No. 2,055,929.

September 29, 1936.

KENNETH SHELLEY JACKSON, ET AL.

It is hereby certified that error appears in the printed specification of the above numbered patent requiring correction as follows: Page 1, first column, line 33, for "chloride" read chlorine; and that the said Letters Patent should be read with this correction therein that the same may conform to the record of the case in the Patent Office.

Signed and sealed this 8th day of December, A. D. 1936.

(Seal)

Henry Van Arsdale
Acting Commissioner of Patents.